(12) United States Patent
Caprioli et al.

(10) Patent No.: US 9,542,191 B2
(45) Date of Patent: Jan. 10, 2017

(54) HARDWARE PROFILING MECHANISM TO ENABLE PAGE LEVEL AUTOMATIC BINARY TRANSLATION

(75) Inventors: Paul Caprioli, Hillsboro, OR (US); Matthew C. Merten, Hillsboro, OR (US); Muawya M. Al-Otoom, Beaverton, OR (US); Omar M. Shaikh, Portland, OR (US); Abhay S. Kanhere, Fremont, CA (US); Suresh Srinivas, Portland, OR (US); Koichi Yamada, Los Gatos, CA (US); Vivek Thakkar, Sunnyvale, CA (US); Pawel Osciak, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 505 days.

(21) Appl. No.: 13/993,792

(22) PCT Filed: Mar. 30, 2012

(86) PCT No.: PCT/US2012/031572
§ 371 (c)(1),
(2), (4) Date: Jun. 13, 2013

(87) PCT Pub. No.: WO2013/147868
PCT Pub. Date: Oct. 3, 2013

(65) Prior Publication Data
US 2013/0311758 A1  Nov. 21, 2013

(51) Int. Cl.
*G06F 9/38* (2006.01)
*G06F 9/30* (2006.01)
(Continued)

(52) U.S. Cl.
CPC .............. *G06F 9/3842* (2013.01); *G06F 8/40* (2013.01); *G06F 8/52* (2013.01); *G06F 9/3017* (2013.01); *G06F 9/4552* (2013.01)

(58) Field of Classification Search
CPC ...... G06F 9/528; G06F 9/4552; G06F 9/3017; G06F 8/52
See application file for complete search history.

(56) References Cited

U.S. PATENT DOCUMENTS 7,107,580 B2   9/2006   Zemach et al.
7,111,290 B1   9/2006   Yates, Jr. et al.
(Continued)

OTHER PUBLICATIONS

Merten et al., An architectural framework for runtime optimization, Jun. 2001, IEEE transactions on computers, vol. 50 No. 6, 23 pages.*

(Continued)

*Primary Examiner* — Andrew Caldwell
*Assistant Examiner* — Jyoti Mehta
(74) *Attorney, Agent, or Firm* — Nicholnson De Vos Webster & Elliott LLP

(57) ABSTRACT

A hardware profiling mechanism implemented by performance monitoring hardware enables page level automatic binary translation. The hardware during runtime identifies a code page in memory containing potentially optimizable instructions. The hardware requests allocation of a new page in memory associated with the code page, where the new page contains a collection of counters and each of the counters corresponds to one of the instructions in the code page. When the hardware detects a branch instruction having a branch target within the code page, it increments one of the counters that has the same position in the new page as the branch target in the code page. The execution of the code page is repeated and the counters are incremented when branch targets fall within the code page. The hardware then provides the counter values in the new page to a binary translator for binary translation.

20 Claims, 13 Drawing Sheets

(51) Int. Cl.
*G06F 9/45* (2006.01)
*G06F 9/455* (2006.01)

(56) References Cited

U.S. PATENT DOCUMENTS

| | | |
|---|---|---|
| 7,363,471 B2 | 4/2008 | Berkowits et al. |
| 7,702,887 B1 | 4/2010 | Grohoski et al. |
| 2002/0104075 A1* | 8/2002 | Bala .................. G06F 9/45504 717/136 |
| 2005/0155018 A1 | 7/2005 | DeWitt, Jr. et al. |
| 2005/0155022 A1* | 7/2005 | DeWitt ............... G06F 11/3612 717/131 |
| 2010/0042976 A1 | 2/2010 | Hines |

OTHER PUBLICATIONS

PCT International Search Report for PCT Counterpart Application No. PCT/US2012/031572, 4 pgs., (Nov. 1, 2012).

PCT Written Opinion of the International Searching Authority for PCT Counterpart Application No. PCT/US2012/031572, 4 pgs., (Nov. 1, 2012).

Extended European Search Report from European Patent Application No. 12873053.7, mailed Dec. 3, 2015, 11 pages.

Lenoski, D. et al., "The DASH Prototype: Logic Overhead and Performance", IEEE Transactions on Parallel and Distributed Systems, IEEE Service Center, Los Alamitos, CA, US, vol. 4, No. 1, Jan. 1, 1993, pp. 41-61, KP000381324, ISSN: 1045-9219, DOI: 10.1109171.205652.

* cited by examiner

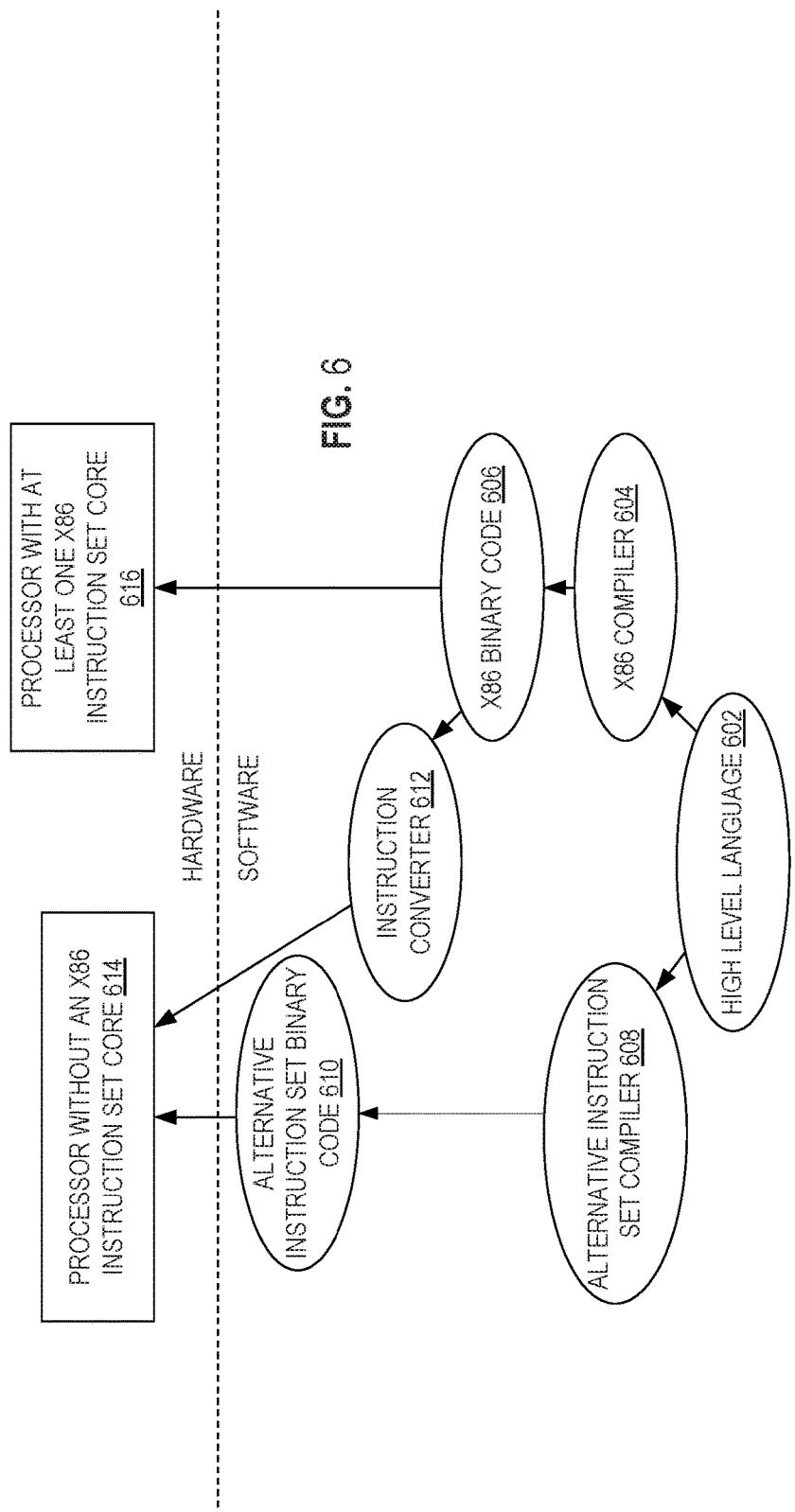

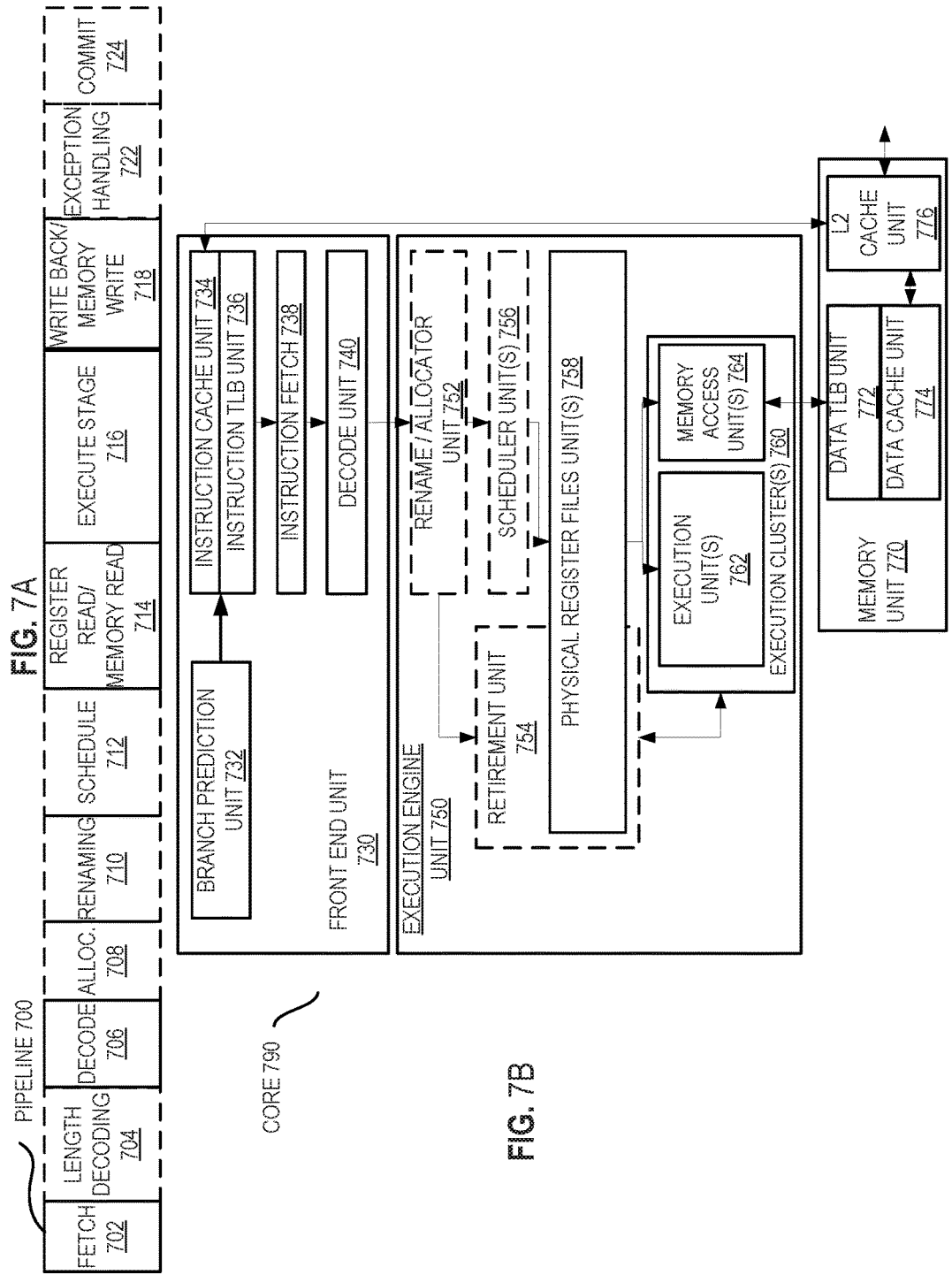

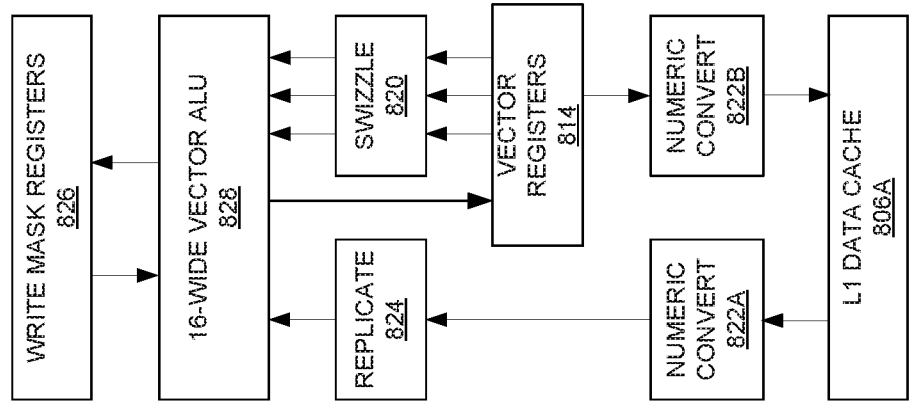
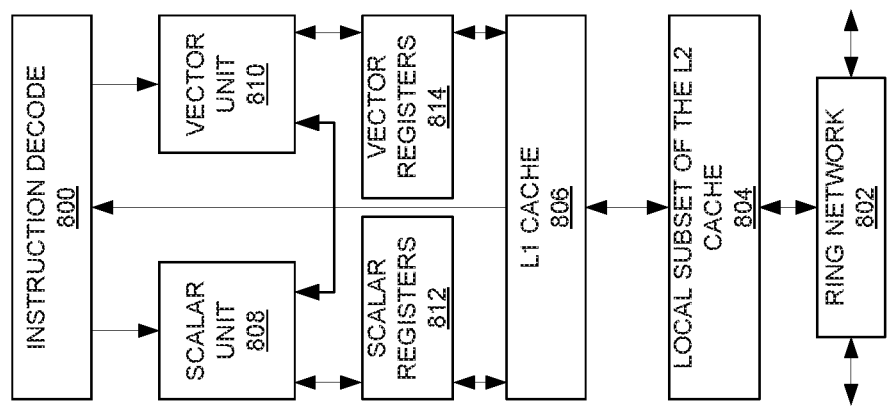

HARDWARE PROFILING MECHANISM TO ENABLE PAGE LEVEL AUTOMATIC BINARY TRANSLATION

CROSS-REFERENCE TO RELATED APPLICATION

This patent application is a U.S. National Phase Application under 35 U.S.C. §371 of International Application No. PCT/US2012/031572, filed Mar. 30, 2012, entitled HARDWARE PROFILING MECHANISM TO ENABLE PAGE LEVEL AUTOMATIC BINARY TRANSLATION.

TECHNICAL FIELD

The present disclosure pertains to the field of processing logic, microprocessors, and associated instruction set architecture that, when executed by the processor or other processing logic, perform logical, mathematical, or other functional operations.

BACKGROUND ART

Computer programs are normally compiled into binary code for a particular computer processor architecture. This causes a problem when the computer processor evolves to implement more advanced instruction sets, more powerful functional units, or different data formats. Each time a new generation of processors is introduced, computer hardware and software venders have to spend significant engineering resources as well as monetary resources to help the old computer programs to run on the new computer processors.

In modern computers, compiled binary code is typically decoded into microcode by a decoder at the front end of a processor. One existing approach to enable old software to run on new processors is dynamic binary translation that translates the binary code from one instruction set to another instruction set. If the compiled binary code contains a hot spot, which is a frequently executed portion of the program, binary translation can be performed on a code region containing the hot spot instead of on the entire code. The result of such partial binary translation is processor-specific and optimized code.

To perform partial binary translation on hot spots, an effective hot spot detection mechanism needs to be in place first. Conventional hot spot detection mechanisms collect and analyze the runtime statistics of binary code to thereby determine the existence of a hot spot. However, conventional hot spot detection mechanisms can use a large amount of memory for storing the collected statistics and can incur significant hardware cost for tracking the runtime behavior of the binary code.

After a hot spot is detected, translator software is invoked to produce an optimized version of the hot spot code. The optimized code is then installed in memory and the optimized version is executed instead of the original native code. The process of finding and optimizing hot spots takes a considerable amount of processing time and hardware resources, which could otherwise be spent executing native code. However, due to the hardware and software limitations, current systems identify and translate the same hot spots, as well as store and install the same optimized code for each virtual address and context in which the hot spots were detected. Thus, the hot spots contained in the same code are redetected and reinstalled every time a new context is created, even if the whole process had been performed previously for the same code. Therefore, system resources are utilized inefficiently and system performance is degraded.

BRIEF DESCRIPTION OF THE DRAWINGS

Embodiments are illustrated by way of example and not limitation in the Figures of the accompanying drawings:

FIG. 6 is a block diagram illustrating the use of a software instruction converter to convert binary instructions in a source instruction set to binary instructions in a target instruction set according to one embodiment.

FIG. 7A is a block diagram of an in-order and out-of-order pipeline according to one embodiment.

FIG. 7B is a block diagram of an in-order and out-of-order core according to one embodiment.

FIGS. 8A-B are block diagrams of a more specific exemplary in-order core architecture according to one embodiment.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

The conventional hot spot detection and binary translation mechanisms do not efficiently utilize system resources. Thus, there is a need for improvement with respect to hot spot detection footprint, the number of translator invocations, and storage size for optimized code and metadata. Embodiments described herein provide a hardware profiling mechanism, which allows hot spots to be monitored with little hardware and software overhead. Embodiments described herein also allow optimized code to be reused across contexts. As a result, hot spot detection footprint can be reduced, and the number of translator invocations and optimized code storage space can be minimized. System performance can be also improved as there are additional opportunities to execute optimized code.

Figure 1:
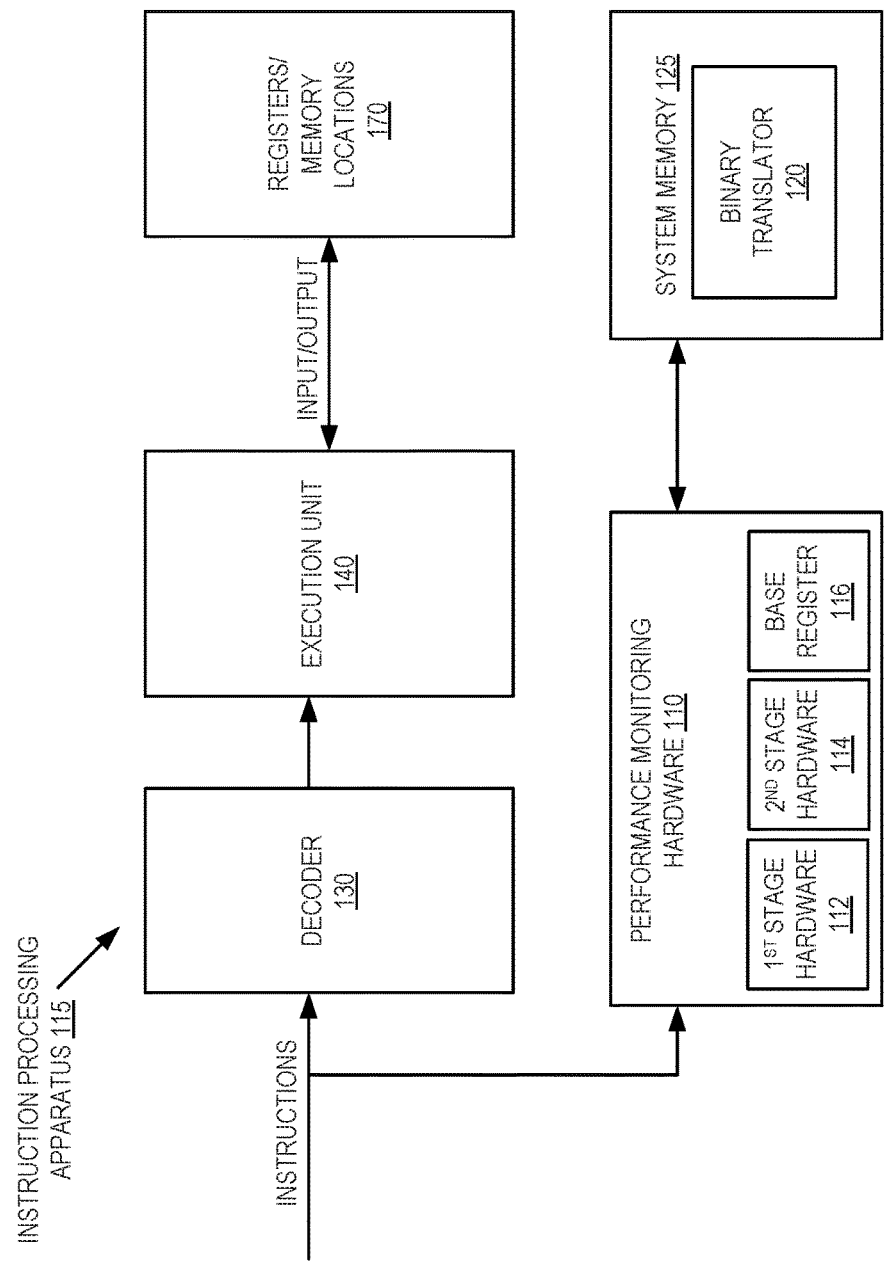
FIG. 1 is a block diagram of an example embodiment of an instruction processing apparatus having performance monitoring hardware according to one embodiment.

FIG. 1 is a block diagram of an embodiment of an instruction processing apparatus 115 having an execution unit 140 operable to execute instructions. In some embodiments, the instruction processing apparatus 115 may be a processor, a processing core of a multi-core processor, or a processing element in an electronic system.

A decoder 130 receives incoming instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 130 may be implemented using various different mechanisms. Examples of suitable mechanisms include, but are not limited to, microcode random access memories (ROMs), look-up tables, hardware implementations, programmable logic arrays (PLAs), other mechanisms used to implement decoders known in the art, etc.

The execution unit 140 is coupled to the decoder 130. The execution unit 140 may receive from the decoder 130 one or more micro-operations, micro-code entry points, microinstructions, other instructions, or other control signals, which reflect, or are derived from the received instructions. The execution unit 140 also receives input from and generates output to registers or memory locations 170.

To avoid obscuring the description, a relatively simple instruction processing apparatus 115 has been shown and described. It is to be appreciated that other embodiments may have more than one execution unit. For example, the apparatus 115 may include multiple different types of execution units, such as, for example, arithmetic units, arithmetic logic units (ALUs), integer units, floating point units, etc. Still other embodiments of instruction processing apparatus or processors may have multiple cores, logical processors, or execution engines. A number of embodiments of the instruction processing apparatus 115 will be provided later with respect to FIGS. 7-13.

According to one embodiment, the instruction processing apparatus 115 includes a performance monitoring hardware 110 to perform hardware profiling. In a scenario where the instruction processing apparatus 115 is a multi-core processor, each processor core can include a copy of the performance monitoring hardware 110. The performance monitoring hardware 110 includes a first stage hardware 112 and a second stage hardware 114. As the apparatus 115 receives a stream of binary instructions, the first stage hardware 112 monitors the instructions to detect whether any of the instructions are amenable to optimization (and, therefore, amenable to binary translation that optimizes the instructions). For example, vector widening is an optimization technique that uses binary translation to convert vector instructions (also known as packed instructions) of an earlier generation instruction set architecture (ISA) (e.g., SIMD Extensions (SSE)) into newer vector instructions operating on wider vector registers (e.g., Advanced Vector Extensions (AVX)), thus improving both performance and performance per watt. For this binary translation opportunity, the first stage hardware 112 can identify code pages containing a significant number of packed SSE instructions.

Instructions can be binary translated from one ISA to another ISA for which the instructions are being executed, as described in the example above. Instructions can also be binary translated for the purpose of memory pre-fetching, improved branch performance, enhanced computation efficiency, etc., where the source and the target of the binary translation may be for the same ISA. Thus, the first stage hardware 112 can detect binary translation opportunities according to a wide range of optimization criteria.

When the first stage hardware 112 detects a significant number of instructions that can be optimized, the performance monitoring hardware 110 identifies the code page containing these instructions. This is because the granularity of binary translation is typically the size of a code page (although in some embodiments the granularity of binary translation can be different from the size of a code page), where the size of a code page may be 4 k bytes or other predetermined size. The performance monitoring hardware 110 sends the physical address of the identified code page (e.g., the base address of the identified code page) to a binary translator 120 and requests a new page to be allocated for tracking the runtime behavior of the identified code page. In one embodiment, the runtime behavior being tracked includes branch frequency and positions of branch targets (that is, the branch targets' offsets within the identified code page). Being associated with the identified code page, this new page only keeps track of the branch targets that fall within the code page. The branch instructions (that cause these branches to occur) can be located within the code page or outside the code page.

In one embodiment, the binary translator 120 is a piece of software that resides in system memory 125 and directly interacts with the performance monitoring hardware 110 without the assistance of an operating system. The binary translator 120 has a set of pages of memory that can be allocated to hold binary translated code. Instead allocating a page during the binary translation process, the binary translator 120 can allocate that same page when a code page is identified for optimization upon request from the performance monitoring hardware 110. The allocated page can be used to hold branch statistics of the associated code page, and can later be re-initialized to hold translated code. Thus, the tracking of branch statistics incurs little or no memory overhead.

After a give code page is identified for optimization, the performance monitoring hardware 110 traps to the binary translator's runtime layer to allocate a new page that will later hold the translated code for the given code page. This new page is a physical page in memory and is mapped to the same virtual address as the given code page. The new page and the given code page can be distinguished using different context identifiers. After the binary translator 120 allocates the new page, it initializes the page to zero, and record the base address (i.e., beginning physical address) of the new page in a base register 116 in the performance monitoring hardware 110. The second stage hardware 114 then monitors all branches (equivalently, jumps or conditional instructions) whose targets fall within this new page. This enables 100% coverage of the page's branch targets, significantly reducing the time required to identify the targets, as compared to discovery through statistical sampling. In one embodiment, this new page is used by the second stage hardware 114 as a collection of counters to count the number of branch targets that fall within the given code page.

Figure 2:
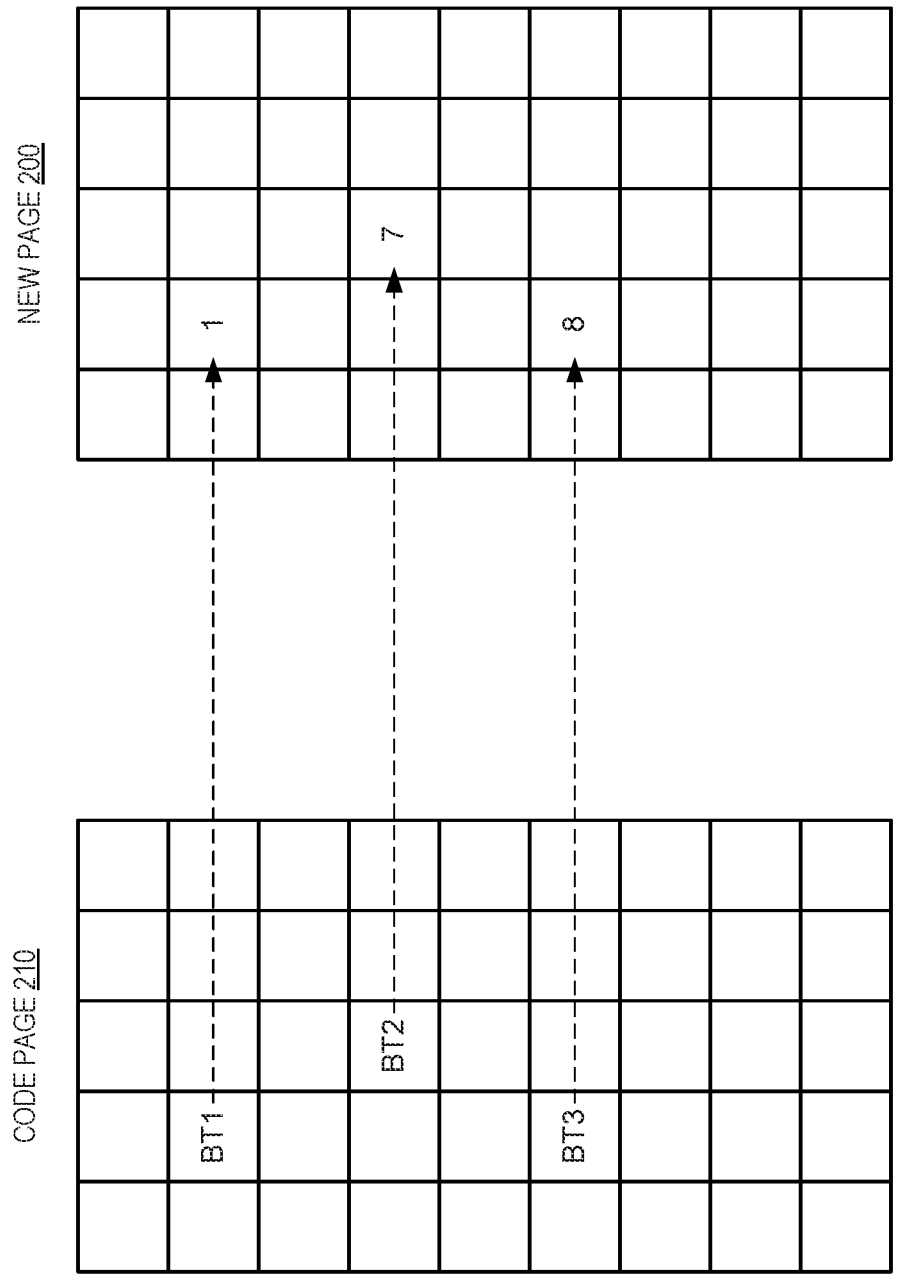
FIG. 2 illustrates an example of a new page allocated for a code page according to one embodiment.

FIG. 2 is a block diagram illustrating an example of a new page 200 utilized as a collection of counters. The new page 200 is allocated for a code page 210. In one embodiment, the new page 200 is set up by the binary translator 120 as a grid of counters, all of which are initialized to zeros. Each counter has the same size, which is not larger than the shortest instruction in (i.e., the granularity of) the ISA to simplify the mapping between the instructions and their associated counters. For x86 ISA (implemented by Intel® Pentium 4 processors, Intel® Core™ processors, and processors from Advanced Micro Devices, Inc. of Sunnyvale Calif.), the shortest instruction is one byte. Therefore, one-byte sized counters can be used such that an instruction within the code page 210 is in the same position as its corresponding counter in the new page 200.

The new page 200 shown in FIG. 2 is a simplified memory image of the page, where each square represents a byte of memory used as counters. The counter values of 1, 7, and 8 are at offsets that correspond to branch targets in the code page 210, and further represent the frequency those branch targets were encountered. For example, if a branch target is at page offset 0x12 of the code page 210, then the hardware (that second stage hardware 114 of FIG. 1) will increment the byte counter at the new page 200 offset 0x12. In the example of FIG. 2, it is shown that branch target $BT_1$ has a counter value of 1, branch target $BT_2$ has a counter value of 7, and branch target $BT_3$ has a counter value of 8. Each branch target and its associated counter have the same byte position (same offset) in their respective pages (e.g., $BT_1$ and its counter are located at the $7^{th}$ byte position, $BT_2$ and its counter are located at the $18^{th}$ byte position, and $BT_3$ and its counter are located at the $27^{th}$ byte position). The counter value indicates the number of branches whose targets are in the byte position of the code page 210. For example, the counter value 1 at the $7^{th}$ byte position of the new page 200 indicates that there is one branch target that lands at the $7^{th}$ byte of the associated code page 210. Each time a branch (equivalently, a conditional instruction or a jump) target in the code page 210 is detected, a corresponding counter in the new page 200 is incremented by one.

In one embodiment, the byte counter is an 8-bit saturating counter. After a number of cycles of executing the code page 210, some of the counters may reach a maximum value (e.g., 255). The counters are saturating counters in that they do not roll over back to zero, but instead stay at the maximum value even if more jumps at the corresponding positions are detected. Further, the counter values can be approximate, so that strict atomic semantics of the read, modify, write is not necessary. This allows the hardware (e.g., the second stage hardware 114 of FIG. 1) performing the counter updates to have a less strict timing requirement and can therefore be built with less cost. In some alternative embodiments, each counter can be 1-bit (Boolean values) instead of the 8-bit counters. In some embodiments, the counters may be kept in dedicated storage (e.g., on-chip) instead of in the memory.

The binary translator 120 can use the branch statistics to determine how to optimize the code page 210. The offsets within the page of all of the observed control transfers can be used to generate entry points into the translated page at these very positions. Additionally, since the binary translator 120 has analyzed the original instructions, it is able to use the counters to identify hotspots, nested loops and their relative trip counts, and common patterns of basic block chaining.

In one embodiment, the new page 200 is the same page that will be overwritten with the translated code. This improves the effectiveness of the cache. The binary translator 120 can cache the counter value data and re-initialize (zero out) the new page 200 for storing the translated code.

In one embodiment, after the binary translator 120 optimizes and translates the code page 210, the translated code is then installed in the new page 200 in memory. When the code execution reaches the code page 210, the translated code in the new page 200 is executed instead of the code page 210. In a conventional system, a hardware mechanism is enabled in the system such that it detects the execution hitting a virtual address (which is allocated to the executed context). The execution is then transferred to the translated code. Thus, the translated code can only be executed in that specific, predefined context.

In a computer system that runs multiple processes or threads, each of the process/thread may be run in a different context and may be allocated with different ranges of virtual addresses. It often occurs that anew context executes the same code as other contexts present in a system, or a new context executes the same code as contexts that were previously present in the system. This happens, for example, when the same application or library is run multiple times in sequence, or multiple instances of it are executing at the same time, or both.

According to one embodiment, the translated code can be reused in time and space. That is, the same translated code resided in the physical page of the new page 200 can be reused for contexts and/or threads that run concurrently, multiple times in sequence, or both.

Generally, operating systems optimize memory usage and disk accesses by sharing physical code pages across multiple contexts running the same code at the same time in a system (within the same processor core or across multiple processor cores), as well as by reusing the same physical code page in time, i.e., when one application or library is invoked multiple times in a sequence. In addition, to increase security, operating systems can map the same physical code page under a different virtual address for different contexts (which is referred to as address space layout randomization). In all of these cases, the optimized version of that code (i.e., the translated code) can be reused, as the contents of the physical code page are identical and it resides under the same physical address.

Embodiments described herein allow optimized code reuse across different contexts and/or mapped under different virtual addresses in a similar manner as an operating system's reuse of physical code pages. Referring again to FIG. 1, when the performance monitoring hardware 110 identifies a code page amenable to binary translation, it first sends the physical address of the code page to the binary translator 120. In one embodiment, the binary translator 120 maintains a history of previously translated pages in the system memory 125. The binary translator 120 checks whether that physical address of the identified code page is already in the history. If it is in the history, it means that the code page has been translated before. Thus, the binary translator 120 can inform the performance monitoring hardware 110 that a translation is already in place and, therefore, it is unnecessary for the hardware 110 to collect the branch statistics of the code page. The binary translator 120 can also return the physical address of the translated page to the hardware to allow execution of the translated page.

If a code page is modified, the translated code produced previously for that code page (before its modification) cannot be used anymore and has to be disabled. In one embodiment, the binary translator 120 can mark a previously translated code page in the history as invalid if its corresponding code page has been modified.

The translated code is context and virtual address agnostic, such that the translated code can be executed using different virtual addresses. The translated code is installed for physical addresses, as opposed to installing it for a context-virtual address pair. The translated code is also position independent. That is, there are no hard-coded addresses; instead, relative addresses are used.

Figure 3:
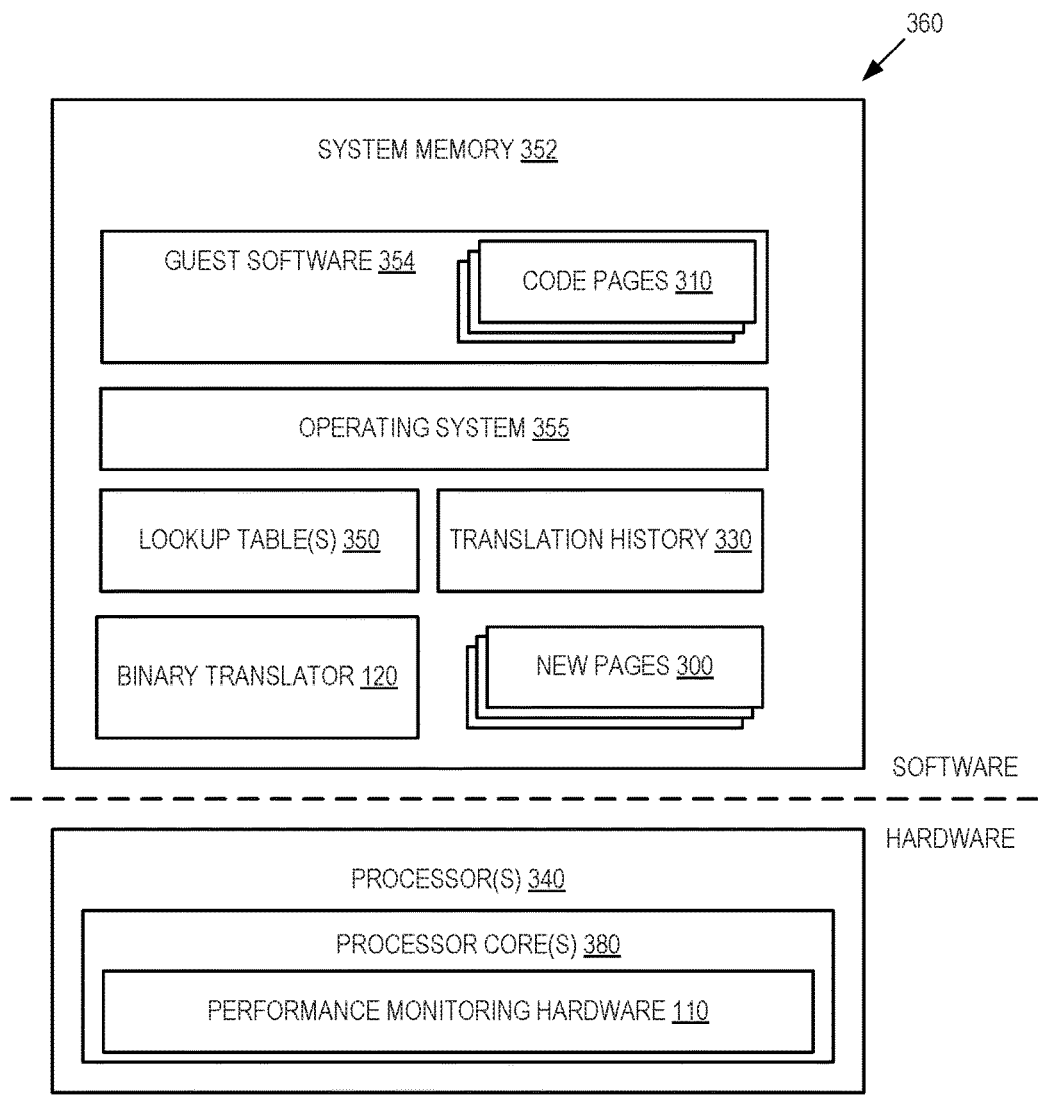
FIG. 3 illustrates elements of a performance monitoring system for runtime binary translation according to one embodiment.

FIG. 3 illustrates elements of a hardware and software co-designed runtime binary translation system for a microarchitecture 360 according to one embodiment. As shown in FIG. 3 the software may include a system memory 352, which may comprise guest software 354 (containing code pages 310), an operating system (OS) 355, binary translator 120 (of FIG. 1), lookup tables 350, translation history 330 and new pages 300 (each of which associated for one code page 310 for holding the branch target counters and later the translated code). In one embodiment, the code pages 310 may be compiled using a specific instruction set. In some embodiments, the code pages 310 may reside in any other software running on the OS 355 (including another OS running on a virtual machine that is managed by a virtual machine manager). In one embodiment, the code pages 310 may be part of the OS 355. The lookup tables 350 can be used to store the mappings from the physical address of each code page 310 to the physical address of the corresponding new page 300.

The binary translator 120 and the lookup tables 350 may be software elements of the micro-architecture 360. The micro-architecture 360 further includes hardware elements, such as one or more processors 340. One or more of the processors 340 may include multiple processor cores 380. Each processor core 380 includes the performance monitoring hardware 110 (of FIG. 1). The performance monitoring hardware 110 includes logic to identify a code page containing instructions that are optimizable, logic to request allocation of a new page associated with the code page, logic to detect a branch instruction having a branch target within the code page, logic to increment the counters when branch targets fall within corresponding positions if the code page, and logic to provide values of the counters in the new page to a binary translator for binary translation.

In one embodiment, the processors 340 may include new features supported by a new generation of processors; for example, the new features may include wider registers (such as, 256 bits, 512 bits or 1024 bits, etc), and other features (e.g., circuitry to enter and exit translated code, circuitry to ensure translation consistency, circuitry for memory disambiguation, circuitry for an atomicity support, circuitry for the runtime monitoring ucode). The binary translator 120 of the micro-architecture 360 may include logic to analyze the hot spots of the code pages 310, logic to translate the identified hot spot portions of the code page into translated code supported by the underlying processor, and a runtime layer to execute (including transition between) the code page and translated code.

Figure 4:
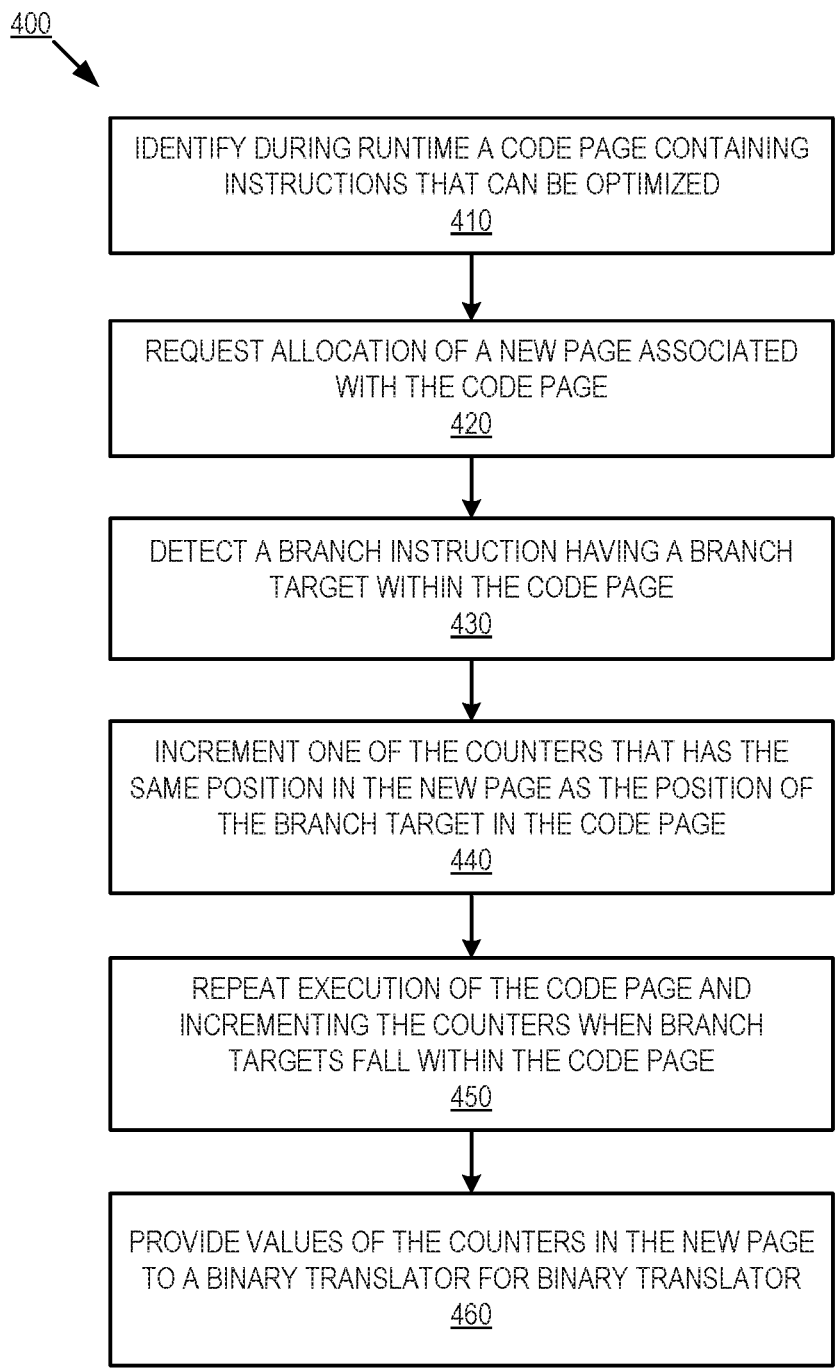
FIG. 4 is a flow diagram illustrating operations to be performed according to one embodiment.

FIG. 4 is a block flow diagram of an example embodiment of a method 400 for performing hardware profiling. In various embodiments, the method 400 may be performed by a general-purpose processor, a special-purpose processor (e.g., a graphics processor or a digital signal processor), or another type of digital logic device or instruction processing apparatus. In some embodiments, the method 400 may be performed by the instruction processing apparatus 115 of FIG. 1, or a similar processor, apparatus, or system, such as the embodiments shown in FIGS. 7-13. Moreover, the instruction processing apparatus 115 of FIG. 1, as well as the processor, apparatus, or system shown in FIGS. 7-13 may perform embodiments of operations and methods either the same as, similar to, or different than those of the method 400 of FIG. 4.

The method 400 begins with hardware (e.g., the performance monitoring hardware 110 of FIG. 1) during runtime identifies a code page in memory containing potentially optimizable instructions (block 410). In one embodiment, the instructions can be computation intensive instructions, instructions from an earlier generation ISA, etc. The hardware requests allocation of a new page in memory associated with the code page (block 420). The request can be sent during runtime without interruption to the instructions being executed. The new page contains a collection of counters and each of the counters corresponds to one of the instructions in the code page. When the hardware detects a branch instruction whose branch target falls within the code page (block 430), it increments one of the counters that has the same position in the new page as the branch target in the code page (block 440). The execution of the code page is repeated and the counters are incremented when branch targets fall within the code page (block 450). The execution of the code page or the computer program that comprises the code page can be repeated for a predetermined number of cycles, for a predetermined length of time, or when a predetermined condition is satisfied. The values of the counters in the new page are provided to a binary translator during runtime for binary translation (block 460). In one embodiment, the performance monitoring, branch target counting, and binary translation can all be performed at runtime when the computer program containing the code page is running. After the code page is translated, the system can automatically switch to the translated code when the code page is reached, without interruption to the execution of the computer program.

Figure 5:
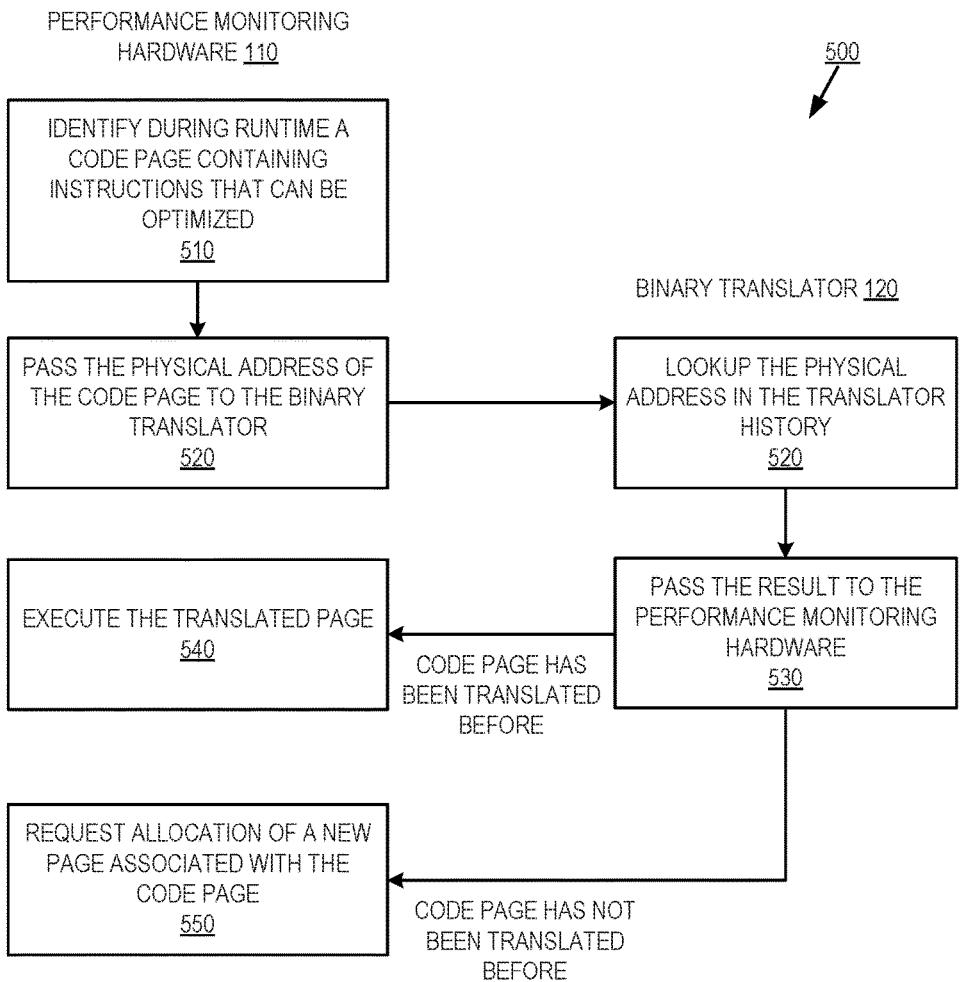
FIG. 5 is another flow diagram illustrating operations to be performed according to one embodiment.

FIG. 5 is a block flow diagram of an example embodiment of a method 500 for reusing a translated code page. In various embodiments, the method 500 may be performed by a general-purpose processor, a special-purpose processor (e.g., a graphics processor or a digital signal processor), or another type of digital logic device or instruction processing apparatus. In some embodiments, the method 500 may be performed by the instruction processing apparatus 115 of FIG. 1, or a similar processor, apparatus, or system, such as the embodiments shown in FIGS. 7-13. Moreover, the instruction processing apparatus 115 of FIG. 1, as well as the processor, apparatus, or system shown in FIGS. 7-13 may perform embodiments of operations and methods either the same as, similar to, or different than those of the method 500 of FIG. 5.

The method 500 begins with hardware (e.g., the performance monitoring hardware 110 of FIG. 1) during runtime identifies a code page containing instructions that can be optimized (block 510, which is the same as block 410 of FIG. 4). After identifying the code page, the performance monitoring hardware 110 passes a physical address identifying the code page to the binary translator 120 (block 520) to allow the binary translator 120 to determine whether the code page has been translated before. In one embodiment, the binary translator 120 looks up the physical address in a list of translation history, which records the physical addresses of all of the previously-translated code pages (block 530). The binary translator 120 passes the lookup result to the performance monitoring hardware 110 (block 540); e.g., by writing into a register. If the physical address of the code page is in the list of translation history, the performance monitoring hardware 110 obtains the physical address of the translated code page and executes the translated code page without requesting the new page to be allocated (block 550). On the other hand, if the physical address of the code page is not in the list of translation history, the performance monitoring hardware 110 requests allocation of a new page from the binary translator 120 (block 560, same as block 420 of FIG. 4).

The binary translator 120 of FIG. 1 may be used as an instruction optimizer where both the source and the target of the optimization are in the same instruction set. In some embodiments, the binary translator 120 may be used as an instruction converter to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
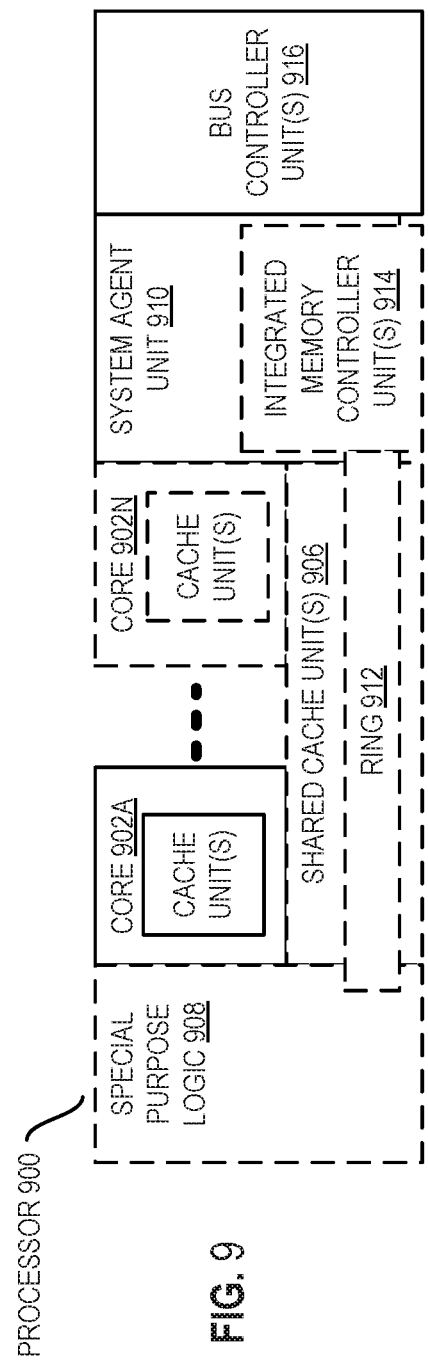
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
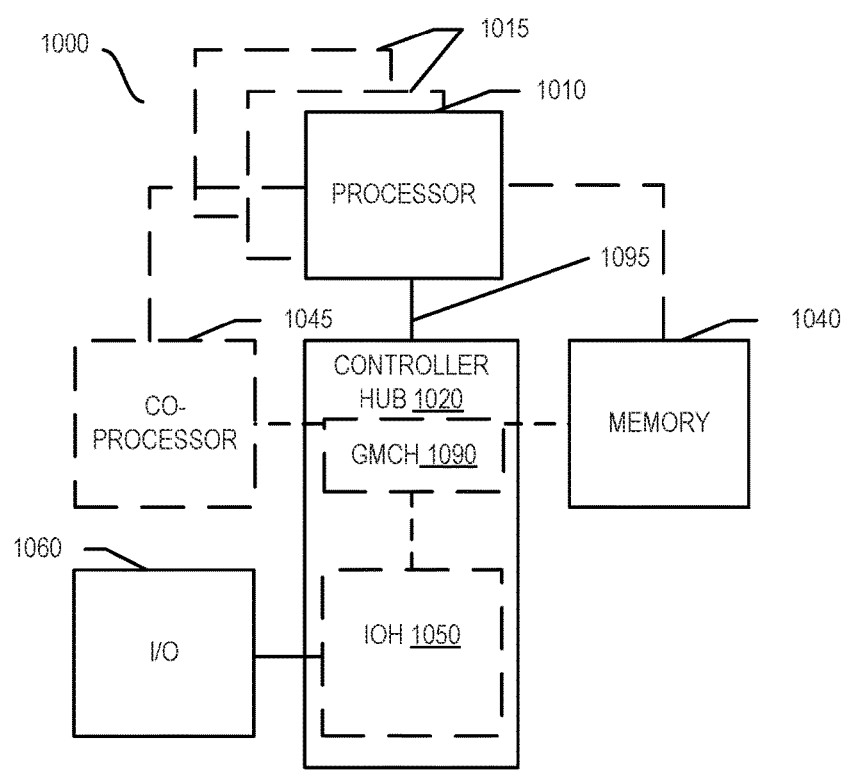
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
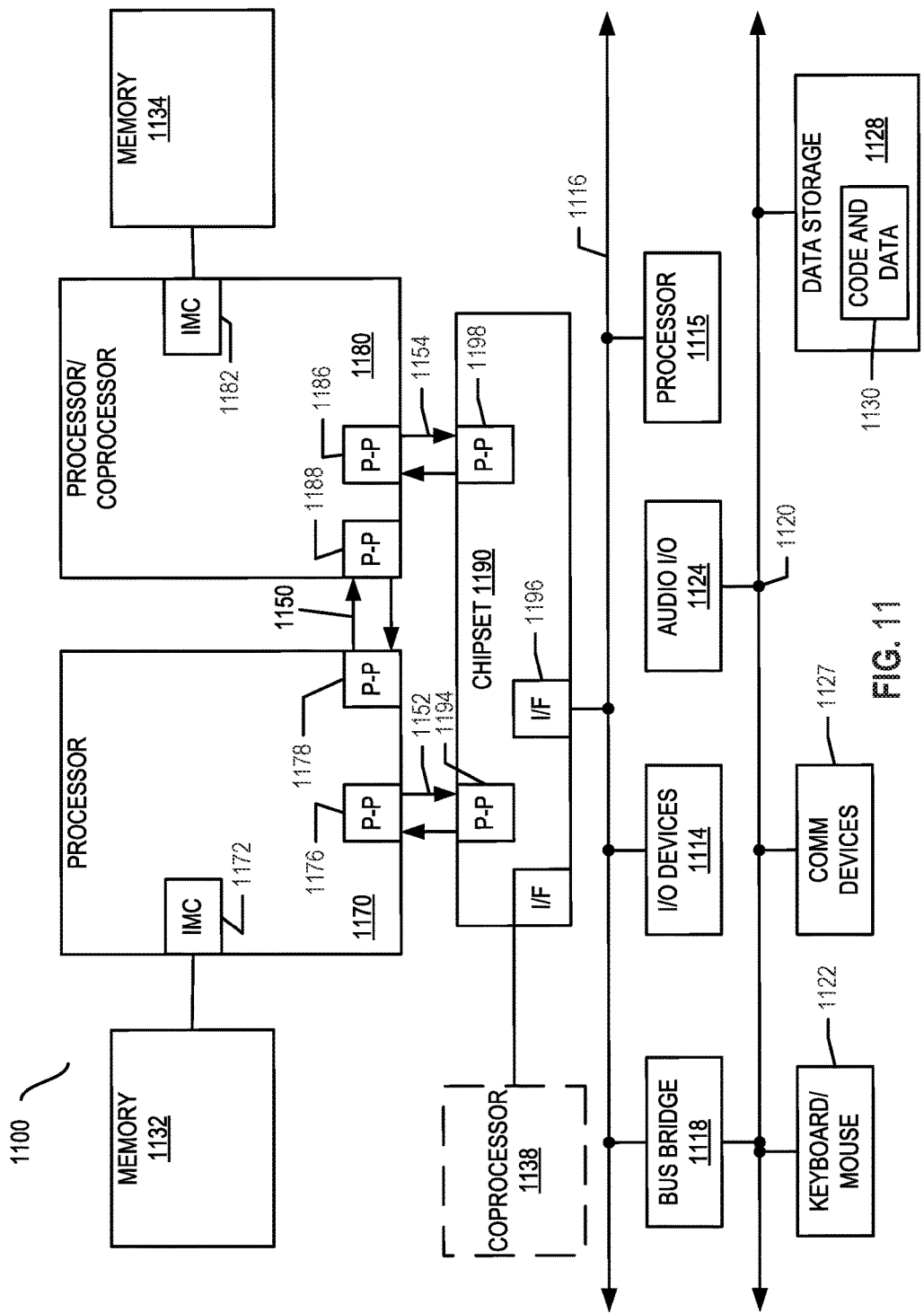
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
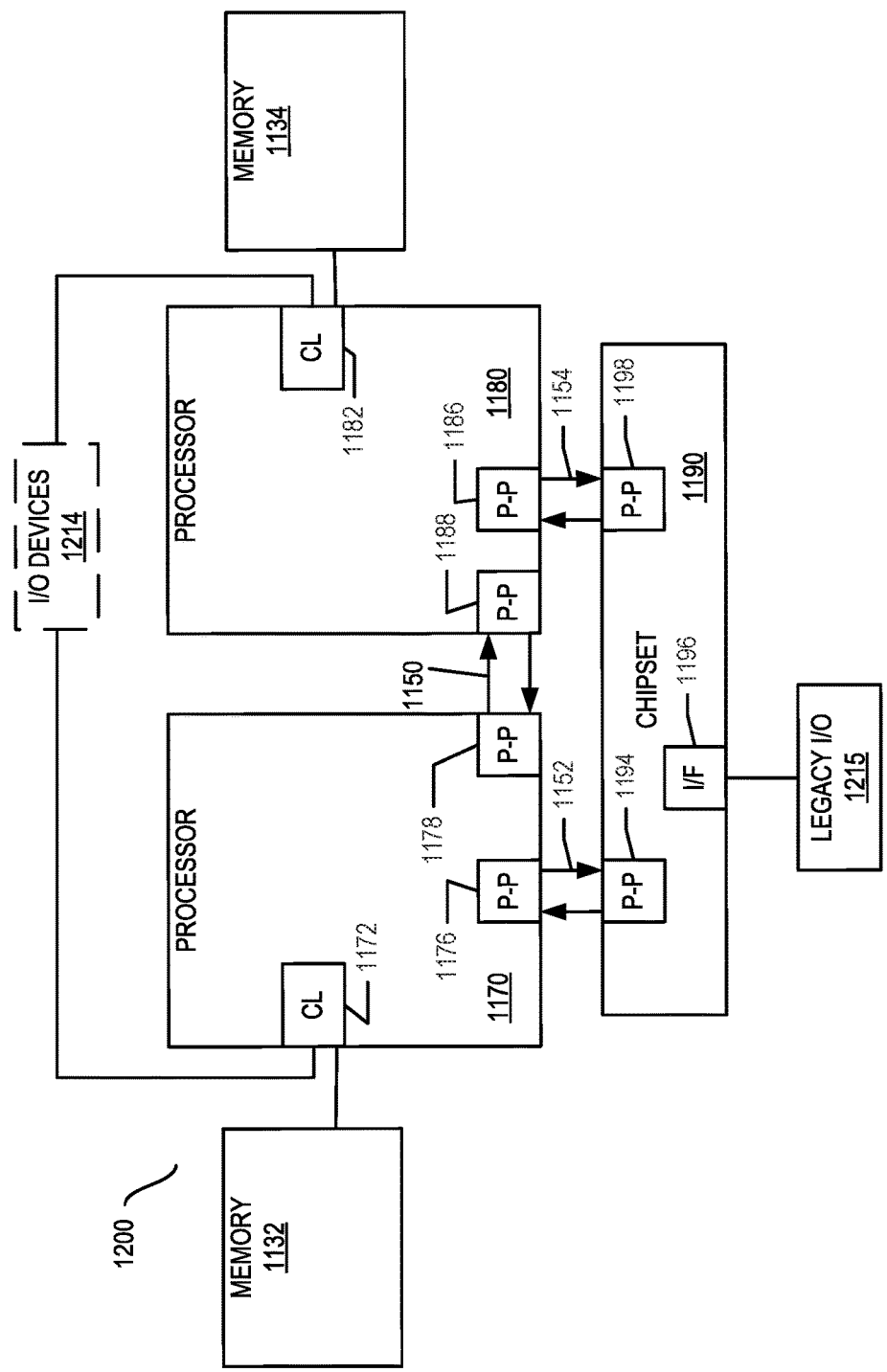
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
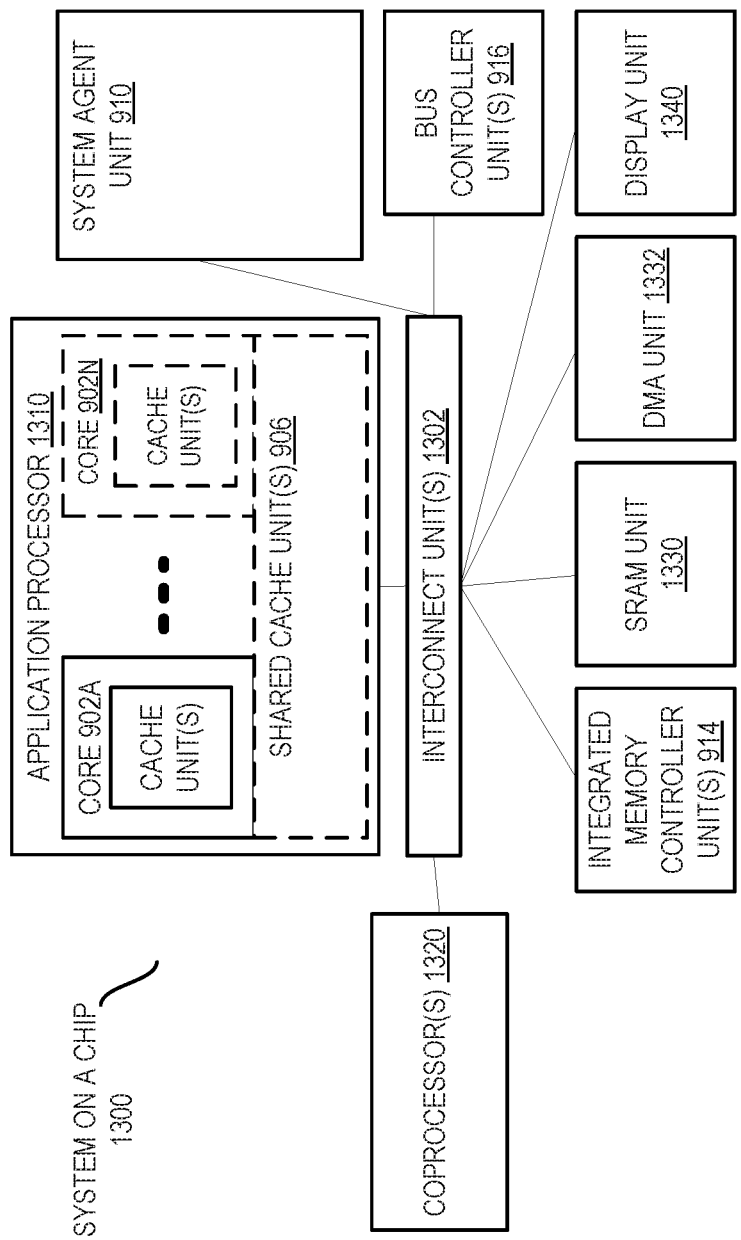
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   one or more processor cores, each of the one or more of the processor cores including performance monitoring hardware; and
   cache units coupled to the one or more processor cores, wherein the performance monitoring hardware is configured to:
      identify a code page in memory containing potentially optimizable instructions;
      request allocation of a new page in the memory, wherein the new page is associated with the code page, and wherein the new page contains a collection of counters and the counters correspond to instructions in the code page;
      detect a branch instruction having a branch target within the code page;
      increment one of the counters that has a same position in the new page as the branch target in the code page;
      repeat execution of code in the code page and incrementing the counters when branch targets fall within the code page; and
      provide values of the counters in the new page to a binary translator for binary translation.

2. The apparatus of claim 1, wherein the new page is used by the binary translator to hold code translated from the code page, thereby replacing the values of the counters.

3. The apparatus of claim 2, wherein the code translated from the code page is sharable among different threads.

4. The apparatus of claim 1, wherein the performance monitoring hardware is further configured to:
   after identifying the code page, pass a physical address identifying the code page to the binary translator to thereby allow the binary translator to determine whether the code page has been translated before; and
   in response to a determination that the code page has been translated before, obtain a physical address of a translated code page and execute code in the translated code page without requesting the new page to be allocated.

5. The apparatus of claim 1, wherein a size of each counter is not larger than the granularity of instructions in the code page.

6. The apparatus of claim 1, wherein each of the counters saturates at a maximum value and does not roll over back to zero.

7. The apparatus of claim 1, wherein the code page is translated into position independent code.

8. A method comprising:
   identifying, by performance monitoring hardware during runtime, a code page in memory containing potentially optimizable instructions;
   requesting allocation of a new page in the memory, wherein the new page is associated with the code page, and wherein the new page contains a collection of counters and the counters correspond instructions in the code page;
   detecting a branch instruction having a branch target within the code page;
   incrementing one of the counters that has a same position in the new page as the branch target in the code page;
   repeating execution of code in the code page and incrementing the counters when branch targets fall within the code page; and
   providing values of the counters in the new page to a binary translator for binary translation.

9. The method of claim 8, wherein the new page is used by the binary translator to hold code translated from the code page, thereby replacing the values of the counters.

10. The method of claim 9, wherein the code translated from the code page is sharable among different threads.

11. The method of claim 8, further comprising:
    after identifying the code page, passing a physical address identifying the code page to the binary translator to thereby allow the binary translator to determine whether the code page has been translated before; and
    in response to a determination that the code page has been translated before, obtaining a physical address of a translated code page and executing the translated code page without requesting the new page to be allocated.

12. The method of claim 8, wherein a size of each counter is not larger than the granularity of instructions in the code page.

13. The method of claim 8, wherein each of the counters saturates at a maximum value and does not roll over back to zero.

14. The method of claim 8, wherein the code page is translated into position independent code.

15. A system comprising:
    memory to store a plurality of code pages;
    a processor coupled to the memory, the processor including performance monitoring hardware configured to:
       identify, during runtime, one of the code pages containing potentially optimizable instructions;
       request allocation of a new page in the memory, wherein the new page is associated with the identified code page, and wherein the new page contains a collection of counters and the counters correspond to instructions in the identified code page;
       detect a branch instruction having a branch target within the identified code page;

increment one of the counters that has a same position in the new page as the branch target in the identified code page;

repeat execution of code in the identified code page and incrementing the counters when branch targets fall within the identified code page; and provide values of the counters in the new page to a binary translator for binary translation.

16. The system of claim 15, wherein the new page is used by the binary translator to hold code translated from the code page, thereby replacing the values of the counters.

17. The system of claim 16, wherein the code translated from the code page is sharable among different threads.

18. The system of claim 15, wherein the performance monitoring hardware is further configured to:

after identifying the one of the code pages, pass a physical address identifying the code page to the binary translator to thereby allow the binary translator to determine whether the identified code page has been translated before; and in response to a determination that the code page has been translated before, obtain a physical address of a translated code page and execute the code in the translated code page without requesting the new page to be allocated.

19. The system of claim 15, wherein each of the counters saturates at a maximum value and does not roll over back to zero.

20. The system of claim 15, wherein the identified code page is translated into position independent code.

* * * * *